United States Patent [19]
Okura et al.

[11] Patent Number: 5,772,392
[45] Date of Patent: Jun. 30, 1998

[54] OBJECT PICKING SYSTEM

[75] Inventors: Ryoichi Okura; Yutaka Saeki, both of Kakogawa, Japan

[73] Assignee: Okura Yusoki Kabushiki Kaisha, Hyogo, Japan

[21] Appl. No.: 699,985

[22] Filed: Aug. 20, 1996

[51] Int. Cl.[6] ....................................................... A01C 9/00
[52] U.S. Cl. ........................ 414/797.9; 414/273; 221/253
[58] Field of Search .............................. 414/797.9, 795.6, 414/795.7; 221/218, 253; 198/418.2

[56] References Cited

U.S. PATENT DOCUMENTS

| 5,271,703 | 12/1993 | Lindquist | 414/273 |
| 5,454,688 | 10/1995 | Pippin | 414/797.9 |
| 5,476,191 | 12/1995 | Dunford et al. | 221/253 |

*Primary Examiner*—Karen B. Merritt
*Assistant Examiner*—Gregory A. Morse
*Attorney, Agent, or Firm*—Morrison Law Firm

[57] ABSTRACT

An object picking system includes a plurality of object storage and discharge devices. Each object storage and discharge device includes an object storage section housing a stack of objects and an object discharge mechanism for discharging the bottommost object of the stack of objects. Each object discharge device is inclined so that part of the weight of the objects rests on the sides of the object storage sections. Each object storage section accommodates a support between a top and bottom of the object storage section to support an upper stack of objects in the object storage section. The support reduces the load on the bottommost object when the stack of objects in the object storage section is large. An auxiliary panel along one side of the object storage section has an adjustable position so that different size objects can be securely held in the object storage section. A horizontal plate is a predetermined height above a bottom surface of the object storage section. The horizontal plate and the bottom surface form a discharge port. The predetermined height of the horizontal plate is adjustable making height of the discharge port adjustable so that different size objects can be discharged.

21 Claims, 12 Drawing Sheets

OBJECT PICKING SYSTEM

BACKGROUND OF THE INVENTION

The present invention relates to an object picking system for selecting and discharging objects from a storage section which contains a plurality of objects onto a conveyor of the object picking device for loading selected ones of those objects into a container.

Conventional object picking systems include object storage sections housing a plurality of vertically stacked objects therein. Each object storage section includes at its lower part a discharge port. Each discharge port is sized so that it allows only the bottommost object in the stack to pass therethrough. A discharge mechanism discharges the bottommost object through the discharge port.

Each object storage section includes supporting plates which support an underside of a bottommost object. A wall portion vertically projects from the upper surface of the supporting plates surrounding the stack of objects. The discharge port is formed in the lower forward end of the wall portion with respect to the direction in which objects are discharged.

According to the above configuration of conventional picking systems, however, when a plurality of objects are vertically stacked in object storage sections, the weight of all the upper objects rests upon those located lower in the stack. A bottommost object supports the weight of the entire stack. When the object has poor tolerance to load weight, it easily incurs damage such as deformation or crushing. Therefore, the number of objects in each stack is limited.

In the above conventional configuration when the stack includes a large number of objects, the weight of the stack generates a large amount of friction between the bottommost object and the load receiving platform and also between the bottommost objects and the object immediately above it when an attempt is made to discharge the bottommost object. The large amount of friction increases the resistance to discharge of the bottommost objects, making the discharge process difficult and unstable. A great force is required discharge an object. Therefore, the discharge unit must apply the great force to the object. Discharging the bottommost object with a great force tends to damage the object. Because of the considerable force necessarily applied to the bottommost object to discharge the bottommost object against the large frictional force, the discharging force often damages the bottommost object during the discharge process. Other damage such as scrapes on the surface of an object, peeling of printing on the surface of an object, and tearing of the wrapping of an object also occur when the bottommost object is discharged against the large frictional force.

When handling various types of objects having different widths (a width being the size of a side of an object perpendicular to the direction in which the object is to be discharged), the position of a narrow object is insecure if it is contained in a wall portion for containing wider objects. For this reason, different wall portions have to be prepared for object of different widths of objects, making it difficult to house objects having different widths.

The discharge port is fixed in the conventional configuration which limits the range of the size of objects which can be discharged.

OBJECTS AND SUMMARY OF THE INVENTION

It is an object of the present invention to provide an object picking system which overcomes the drawbacks of the prior art.

It is another object of the present invention to provide an object picking system in which different sized objects are easily housed.

It is another object of the present invention to provide a object picking system which reduces a load put on the lower objects of a stack in an object storage section, thereby protecting the lower objects from damage which may be otherwise incurred during their storage or when being discharged.

Briefly stated, an object picking system includes a plurality of object storage and discharge devices. Each object storage and discharge device includes an object storage section housing a stack of objects and an object discharge mechanism for discharging the bottommost object of the stack of objects. Each object discharge device is inclined so that part of the weight of the objects rests on the sides of the object storage sections. Each object storage section accommodates a support between a top and bottom of the object storage section to support an upper stack of objects in the object storage section. The support reduces the load on the bottommost object when the stack of objects in the object storage section is large. An auxiliary panel along one side of the object storage section has an adjustable position so that different size objects can be securely held in the object storage section. A horizontal plate is a predetermined height above a bottom surface of the object storage section. The horizontal plate and the bottom surface form a discharge port. The predetermined height of the horizontal plate is adjustable making height of the discharge port adjustable so that different size objects can be discharged.

According to an embodiment of the present invention, an object picking device for storing at least one stack of at least first and second objects and discharging a first object of the at least one stack onto an object conveyor, includes at least a first object storage/discharge device, the at least first object storage/discharge device having an object storage section, the object storage section having a front panel and a side panel at an angle to each other, means for supporting the at least first object storage/discharge device, first means for supporting the object storage section inclined toward the front panel, whereby the objects are gravity urged to the front panel and second means for supporting the object storage section inclined toward the side panel, whereby the objects are gravity urged to the front panel.

According to another embodiment of the present invention, an object picking device for storing at least one stack of at least first and second objects and discharging a first object of the at least one stack onto an object conveyor, includes at least a first object storage/discharge device, the at least first object storage/discharge device having an object storage section, the object storage section having a front panel and a side panel at an angle to each other, means for supporting the at least first object storage/discharge device, first means for supporting the object storage section inclined toward the front panel, whereby the objects are gravity urged to the front panel, second means for supporting the object storage section inclined toward the side panel, whereby the objects are gravity urged to the front panel, a plurality of chutes, the objects fall a distance from object storage/discharge device onto a first of the plurality of chutes, the objects fall a second distance from the first of the plurality of chutes onto a next chute, the objects fall repeatedly onto a next one of the plurality of chutes until the objects fall onto the object conveyor.

According to another embodiment of the present invention, an object picking device for storing at least one stack of at least first and second objects and discharging a first object of the at least one stack onto an object conveyor, includes at least a first object storage/discharge device on each side of the object conveyor, the at least first object storage/discharge device having an object storage section, the object storage section having a front panel and a side panel at an angle to each other, means for supporting the at least first object storage/discharge device, first means for supporting the object storage section inclined toward the front panel, whereby the objects are gravity urged to the front panel, second means for supporting the object storage section inclined toward the side panel, whereby the objects are gravity urged to the front panel and the at least first object storage/discharge device on a first side of the object conveyor being taller than the at least first object storage/discharge device on a second side of the object conveyor.

According to still another embodiment of the present invention, an object picking device for storing stacks of at least first and second objects and discharging a first object of each stack onto an object conveyor, includes a least first and second object storage/discharge devices mounted adjacent to each other on at least one side of the object conveyor, each of the at least first and second object storage/discharge devices includes an object storage section, the object storage section having a front panel and a side panel at an angle to each other, the front panel facing the object conveyor, first means for supporting the object storage section inclined toward the front panel, whereby the objects are gravity urged to the front panel, second means for supporting the object storage section inclined toward the side panel, whereby the objects are gravity urged to the side panel, a plate connected to a bottom of the front panel, the plate being positioned at a predetermined height from bottom surface of the object storage section to form a discharge port, means for adjusting the predetermined height of the horizontal plate thereby adjusting a height of the discharge port, an auxiliary panel connected to a side of each of the object storage sections opposite the side panel and means for adjusting a distance between the auxiliary panel and the side panel.

According to a configuration of an object picking system of the present invention, each one of a plurality of object storage frames is diagonally connected to a main frame such that a front panel is inclined in the discharge direction. A side panel is also inclined toward a side of the object storage frame on which the side panel is connected. Objects stacked in the object storage frame are supported by a bottom surface and the front and side panels. Therefore, as a moment of the load of the objects, which works in a direction perpendicular to the bottom surface portions, is reduced, the load of the upper objects applied on the lower objects in the object storage section is also reduced.

In another embodiment, each object storage section includes an auxiliary frame. Each auxiliary frame connects to the main frame parallel to and facing an inner surface of the side panel of the object storage frame of the object storage section, against which objects contained the object storage section are supported. Whenever the object storage section has to contain narrow objects, a width of each object storage section can be adjusted to the width of narrower objects. Therefore this embodiment of the present invention easily handles objects having different widths.

The above, and other objects, features and advantages of the present invention will become apparent from the following description read in conjunction with the accompanying drawings, in which like reference numerals designate the same elements.

DETAILED EXPLANATION OF THE PREFERRED EMBODIMENT

Figure 1:
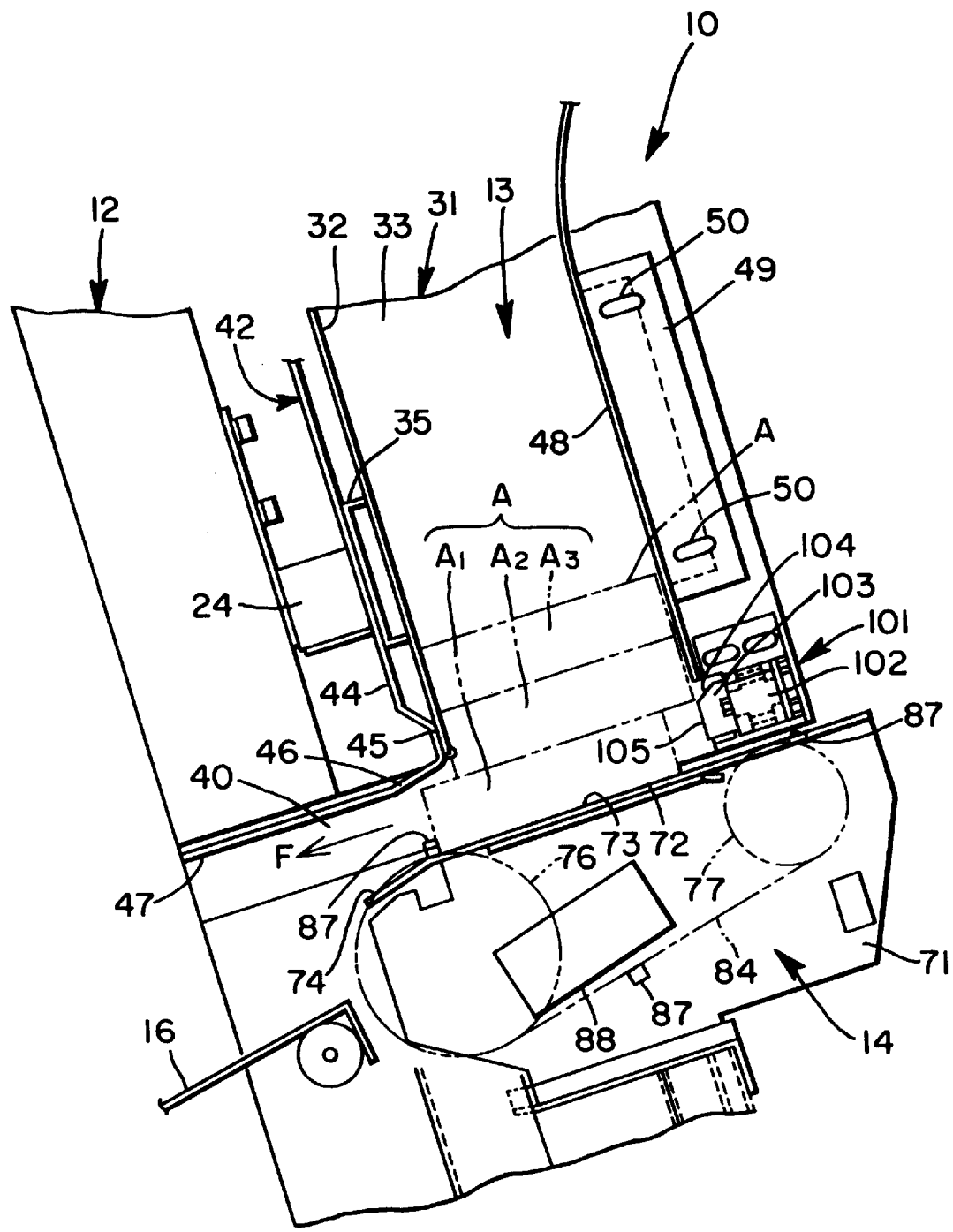
FIG. 1 shows a side view of an object storage/discharge mechanism of an object picking device according to an embodiment of the invention.

Referring to FIG. 1, an object storage/discharge unit, shown generally at 10, includes an object storage section 13 and an object discharge unit 14. Object storage section 13 includes a storage frame 31 mounted in an inclined position on main frame 12. Storage frame 31 contains a plurality of objects A, stacked one upon another. Storage frame 31 has an essentially L-shaped cross section including a front panel 32 and a side panel 33. Front panel 32 supports the forward end of objects A leaning against it in a discharge direction F in which the objects are to be discharged (hereinafter simply referred to as the forward end). Side panel 33 is formed by bending a side of front panel 32 at a right angle. Thus, the forward end and a side of object storage section 13 are front panel 32 and side panel 33 of storage frame 31, respectively. The other side of storage section 13 is formed by an adjacent side panel 33 of an adjacent storage frame 31 (not shown).

A mounting member 35 having an essentially U-shaped section supports the forward end of front panel 32. Mounting member 35 is connected to a rail member 24 to hold each object storage/discharge unit 10 in place.

A rear guide panel 48 is connected to side panel 33 of storage frame 31 for guiding the rear ends of objects with respect to discharge direction F in which the objects are going to be discharged (hereinafter simply referred to as the rear end). Side panel 33 is connected to rear guide panel 48 by an attachment strip 49. Attachment strip 49 is an edge of a side of rear guide panel 48, bent at a right angle so that it is parallel to side panel 33 of storage frame 31.

Attachment strip 49 attaches to side panel 33 with fasteners such as bolts (not shown) through elongated holes 50. Elongated holes 50 are elongated in a direction parallel to discharge direction F. The distance between rear guide panel 48 and front panel 32 is adjusted by moving rear guide panel 48 on the unillustrated bolts along elongated holes 50. Rear guide panel 48 thus moves in a direction parallel to discharge direction F. When rear guide panel 48 reaches the desired position it is fixed there by tightening the bolts in elongated holes 50.

A bottom of object storage section 13 is defined by a pair of load receiving platforms 72. Load receiving platforms 72 support a bottommost object $A_1$. A discharge port 40 at a forward end of load receiving platforms 72 permits only bottommost object $A_1$ to pass through it at one time. A chute 16, attached to the front end of object discharge unit 14, guides the discharged objects A.

A discharge port frame 42 forms the upper portion of discharge port 40. Discharge port frame 42, having approximately the same width as that of front panel 32 of object storage section 13, is an integral body including a mounting plate 44, a holding plate 45 extending from mounting plate 44, an inclined plate 46 inclined downward toward discharge port 40, and a horizontal plate 47. Mounting plate 44 is sandwiched between mounting members 35 and rail members 24. Holding plate 45 is parallel and close to the forward plane of front panel 32. The distance between horizontal plate 47 and supporting plates 72, in other words the height of discharge port 40, is adjusted according to a thickness of object A by adjusting the mounting height of discharge port frame 42.

A lifting means 101 is mounted at the rear end of the bottom of object storage section 13, opposite discharge port 40. Lifting means 101 includes an air cylinder 102 that serves as an actuator. Air cylinder 102 is connected to side panel 33 of storage frame 21. A lifting member 103 is connected to air cylinder 102. Lifting member 103 advances or retracts by the operation of air cylinder 102.

Lifting member 103 includes a vertical pushing surface 105 for pushing bottommost object $A_1$ in discharge direction F when lifting member 103 advances. Lifting member 103 also includes an inclined lifting surface 104 which contacts a rear bottom edge of a next bottommost object $A_2$, thereby lifting next bottommost object $A_2$ upward as lifting member 103 is advanced. While lifting the rear corner of next bottommost object $A_2$, lifting member 103 also applies a forward force to next bottommost object $A_2$ whereby object $A_2$ tend to be wedged against the surface of front panel 32, thereby removing a substantial part of the downward force from next bottommost object $A_2$ and higher, from bottommost object $A_1$. Lifting means 101 separates the bottommost object $A_1$ from the remainder of the stack by lifting all objects A that are positioned above bottommost object $A_1$ upward when lifting member 103 advances.

Discharge unit 14 includes a vertically mounted frame board 71. The pair of load receiving platforms 72, in the shape of first and second spaced apart parallel narrow plates, extend in discharge direction F. Load receiving platforms 72 connect to a top of vertically mounted frame board 71. The upper surface of each load receiving platform 72 is a supporting surface 73 for receiving the underside of bottommost object A. A chute surface 74, inclined downward toward chute 16, is formed at the forward end of each supporting surface 73.

A large timing pulley 76 with a large diameter and a small timing pulley 77 with a smaller diameter are mounted at one side of frame board 71. Large timing pulley 76 and small timing pulley 77 are located at the downstream side and the upstream side, respectively, with respect to discharge direction F.

A timing belt 84 is reeved about large timing pulley 76 and small timing pulley 77. Timing belt 84 includes three discharge projections 87 at regular intervals on its outer surface. Each discharge projection 87 is a square shape having a same width as that of timing belt 84 and a height sufficient to push bottommost object $A_1$ along discharge direction F when projected above load receiving platforms 72 and moved forward. Instead of a pulley and belt system, a wheel and chain system, a wheel and cable system, or any other suitable pushing device is considered to be within the scope of this invention. A motor 88 drives large timing pulley 76.

Figure 2:
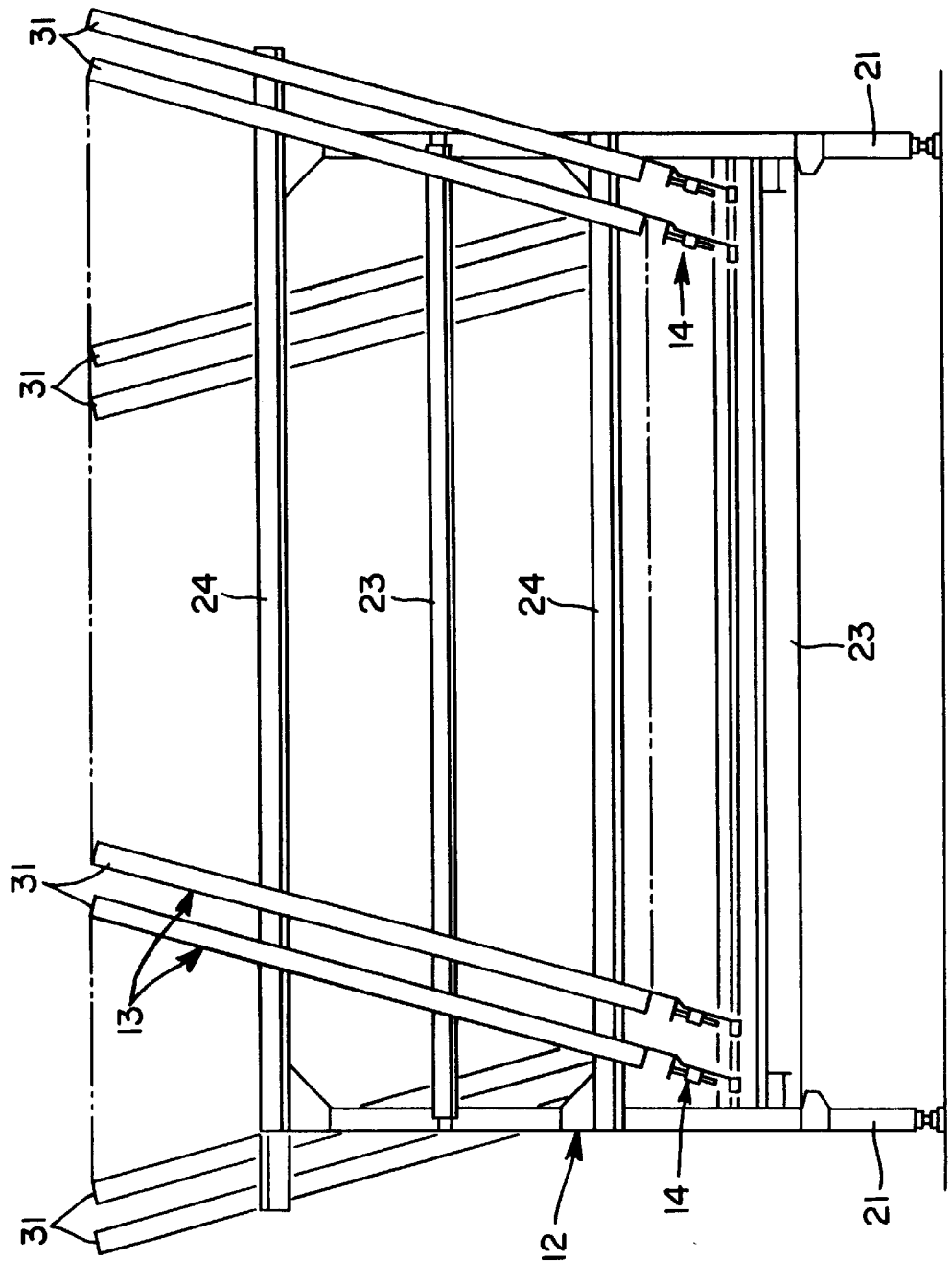
FIG. 2 shows a side view of an object picking system according to an embodiment of the invention.

Referring to FIG. 2, each object storage frame 31 is diagonally connected to a main frame 12. Main frame 12 includes leg members 21 at each end. Leg members 21 are joined by connecting members 23. Horizontally laid rail members 24 are attached to both sides of main frame 12, one each being disposed at the upper end and the middle of each side of the main frame 12. The relative positions of the object storage sections 13 and the discharge units 14 are also shown.

Referring again to FIG. 1, the space between side panel 33 and side panel 33 of adjacent object storage frame 31 serves as an object storage section 13, in which a plurality of objects stacked one upon another are contained.

Figure 3:
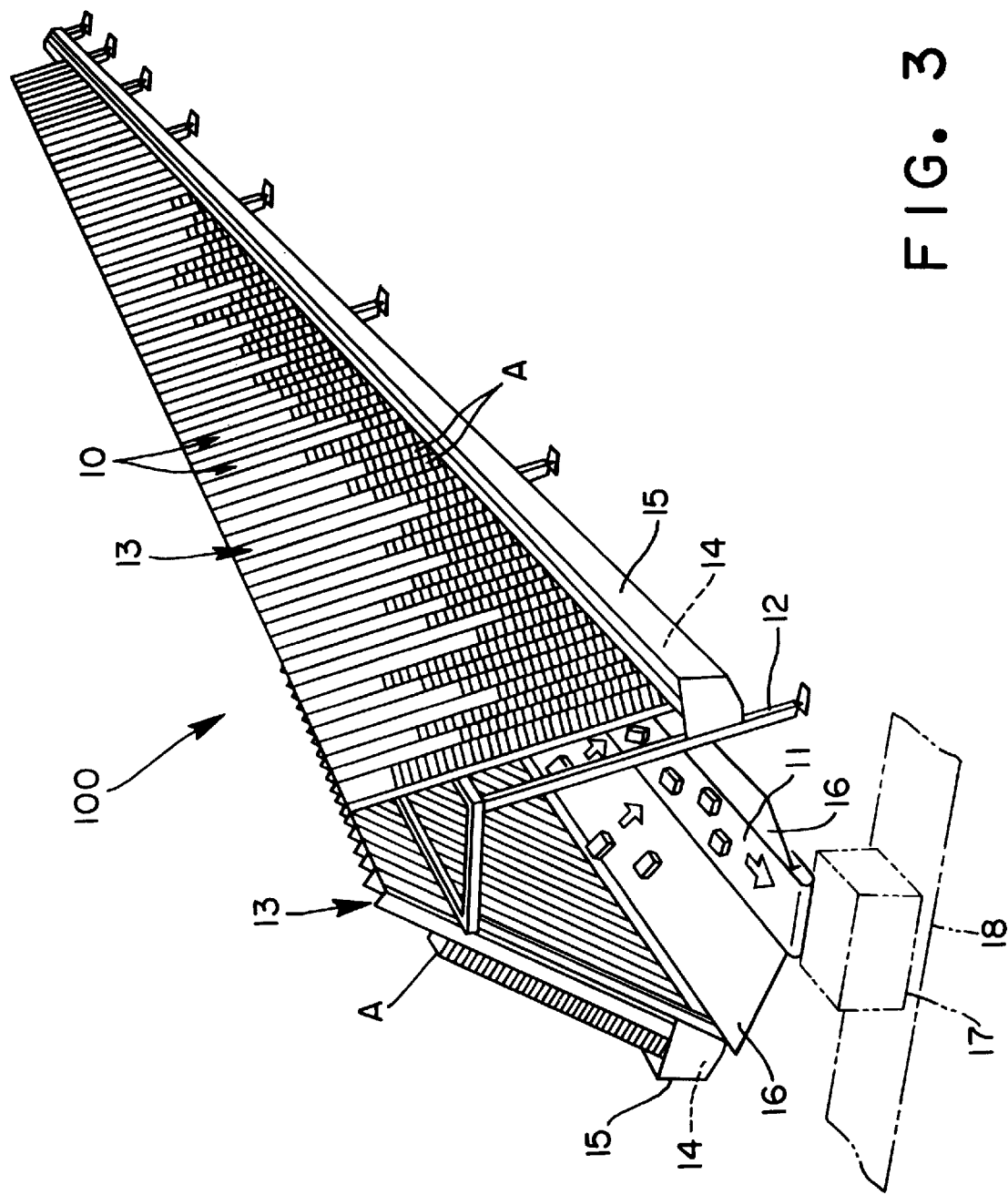
FIG. 3 shows a perspective view of the object picking system of FIG. 2.

Referring to FIG. 3 an object picking system, shown generally at 100, includes an object conveyor 11. An essentially A-shaped main frame 12 straddles object conveyor 11. A plurality of object storage/discharge units 10, as previously described, are mounted along the sides of main frame 12. Each object storage/discharge unit 10 houses a stack containing a plurality of objects A. Objects A are sorted in groups according to their types and stacked one upon another in separate object storage/discharge units 10 along main frame 12. Discharge units 14 are covered by covers 15. Discharge units 14 discharge bottommost object $A_1$ from among the objects contained in an object storage section 13 of each object storage/discharge unit 10. A chute 16 at each side of picking system 100 directs discharged objects A onto object conveyor 11. Chutes 16 are mounted between each row of discharge units 14 and a side edge of object conveyor 11 which faces the row of discharge units 14.

A container conveyor 18, located below an end of the conveying path of belt conveyor 11, preferably extends perpendicularly to belt conveyor 11. Container conveyor 18 feeds containers 17, each of which will house objects discharged by each cycle of retrieval, to a loading position below the end of the conveying path of object conveyor 11.

Figure 4:
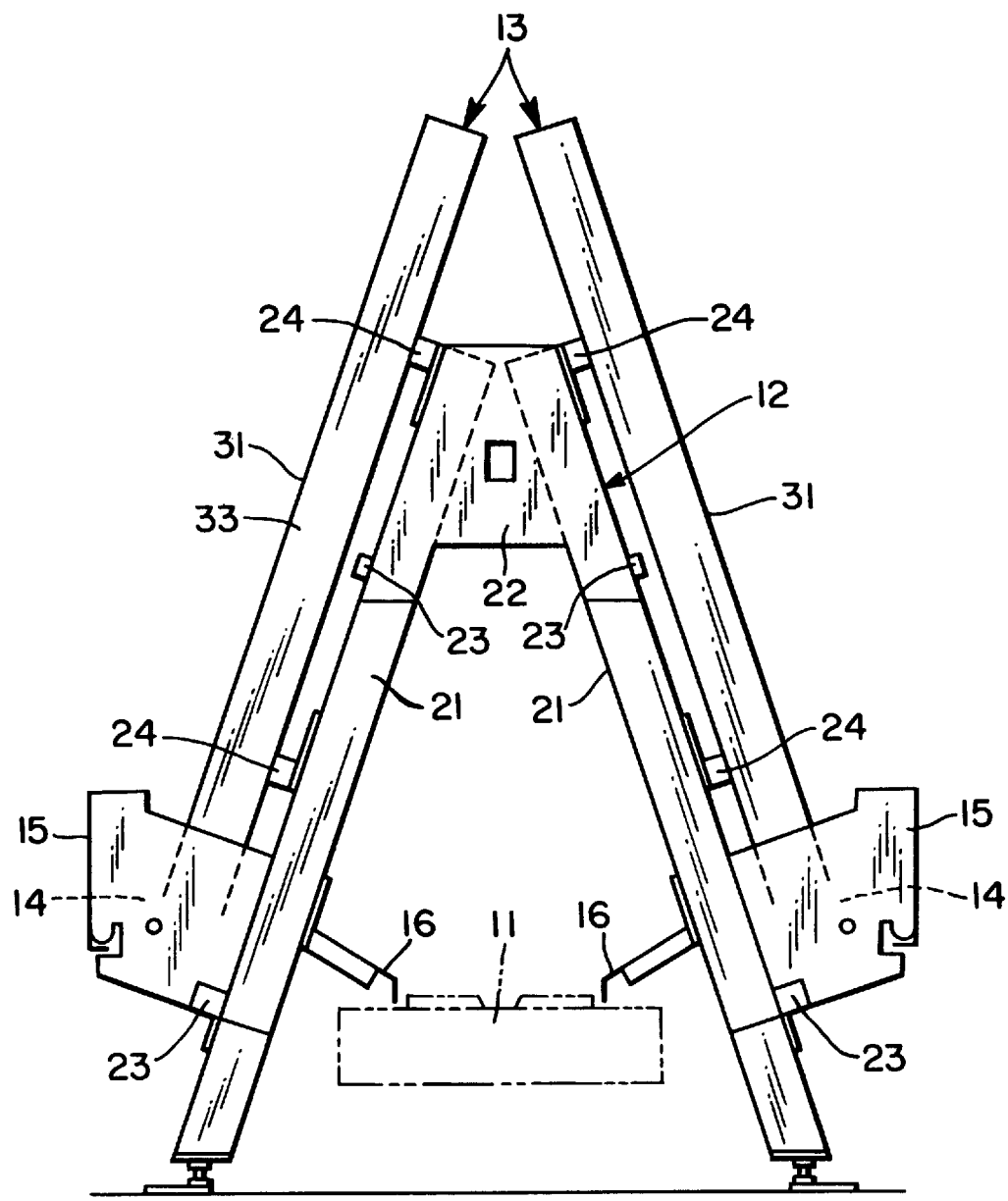
FIG. 4 shows a front view of the object picking system shown in FIG. 2.

Referring to FIG. 4, chutes 16 direct discharged objects A to the center of object conveyor 11 of object picking system 100. Downward directed flanges at the extremities of chutes 16 also ensure that objects A do not roll off of or are not pushed off of the sides of object conveyor 11.

Each end of main frame 12 includes a pair of leg members 21 (also see FIG. 2) angled outward and joined at the upper part thereof by a joint 22. Connecting members 23 are horizontally disposed. Connecting members 23 join together leg members 21 on each side of the respective assembled bodies.

Figure 5:
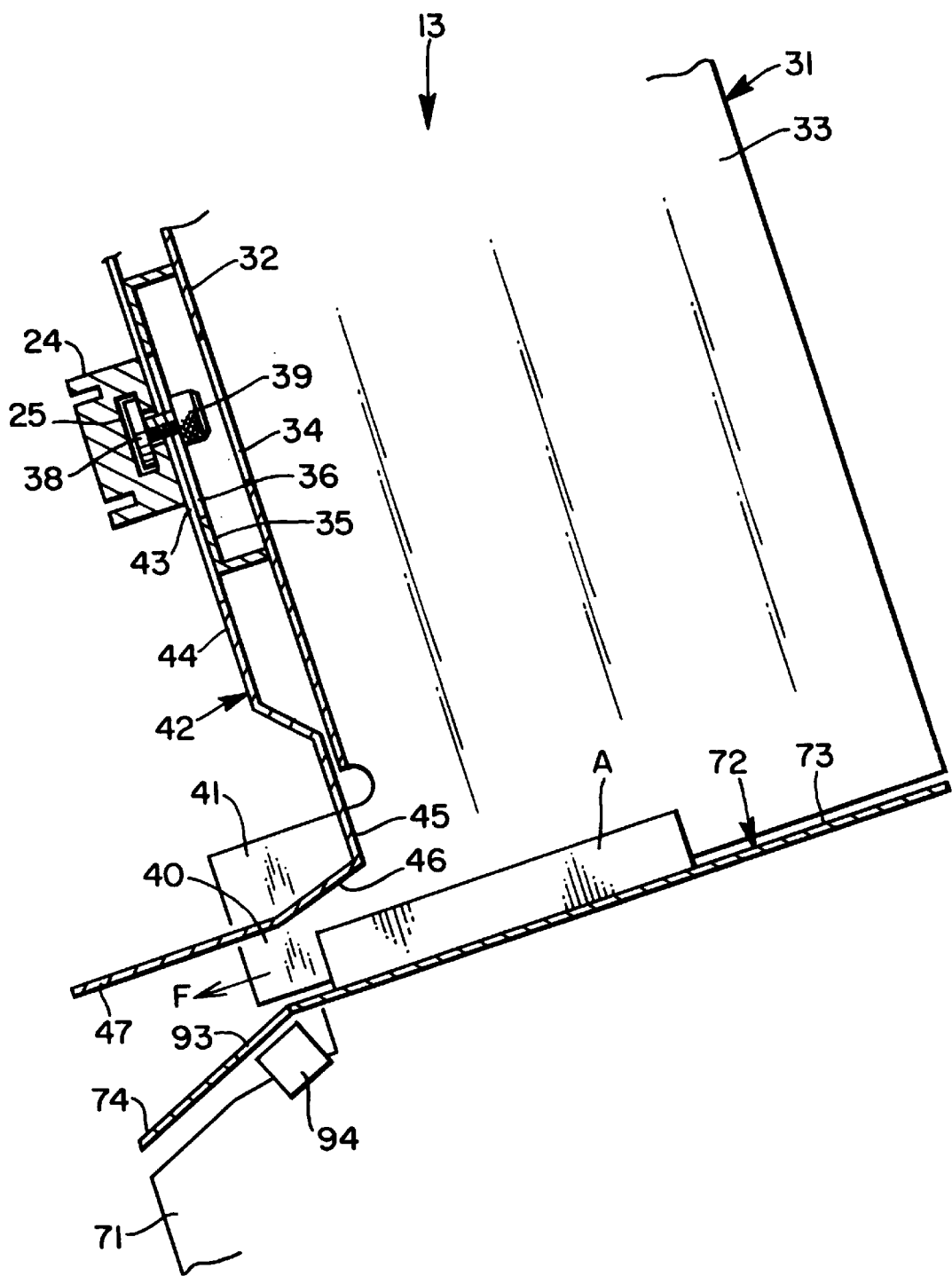
FIG. 5 shows a sectional view of a lower portion of an object storage section of an embodiment of the present invention.

Referring to FIG. 5, a T-slot 25 open to an outer surface is formed in each rail member 24 extending along the length of rail member 24. Vertically elongated operation holes 34 are formed in front panel 32, at locations near the upper and lower ends of front panel 32. Each mounting member 35 includes a vertically elongated mounting hole 36, at locations where respective operation holes 34 are formed. Rectangular nuts 38 are fitted in T-slot 25 of each rail member 24. A bolt 39, disposed in each mounting member 35, is inserted through mounting hole 36 into the corresponding rectangular nut 38 fitted in T-slot 25. Tightening bolts 39, which are thus inserted through operation holes 34, affixes each object storage frame 31 to main frame 12.

Mounting plate 44, which has a vertically elongated groove hole 43 for permitting bolt 39 to be inserted therethrough, is sandwiched between mounting member 35 and rail member 24, thereby holding discharge port frame 42 in place. A discharge guide 41 projecting in the direction of discharge port 40 is formed at the lower part of side panel 33.

Chute surface 74 includes a cutout portion 93 which houses a discharge detection sensor 94. Discharge detection sensor 94 optically detects that an object A has completed its discharge from discharge unit 14.

Each object storage frame 31 is diagonally connected to main frame 12 in such a manner that its front panel 32 is inclined in discharge direction F.

Figure 6:
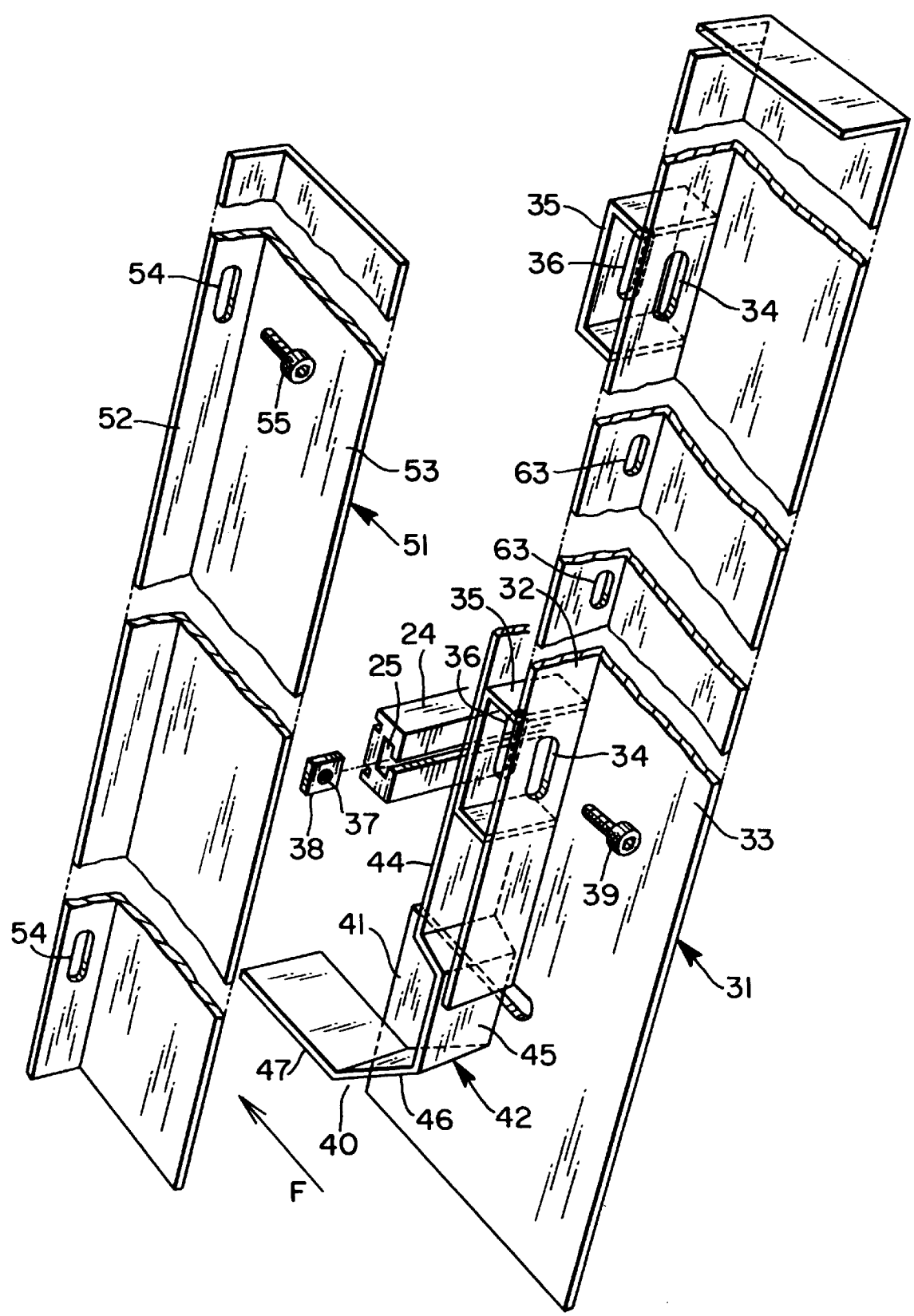
FIG. 6 shows an exploded perspective view of the portion of the object storage section shown in FIG. 5.

Referring to FIG. 6, an auxiliary frame 51 of each object storage frame 31 has an essentially L-shaped section, including a mounting plate 52 and a side plate 53. Mounting plate 52 includes vertically elongated mounting holes 54 for alignment with rail members 24. Auxiliary frame 51 is used with object storage frame 31 for containing objects A having a smaller width, i.e. a smaller length of the side extending perpendicularly to discharge direction F, or for object storage frame 31. In the same manner as attaching object storage frame 31, auxiliary frame 51 is attached to rail members 24 with bolts 55 in such a way as to face and extend parallel to the inner surface of side panel 33 of object storage frame 31, against which objects A will rest. By adjusting the positions where auxiliary frame 51 is attached to rail members 24, the distance between auxiliary frame 51 and side panel 33 of object storage section 31 can be adjusted in accordance with the width of object A.

Side panel 33 is inclined in the direction of the side of the object storage frame at which side panel 33 is mounted. Objects A contained in storage frame 31 lean against the inner surface of front panel 32 and side panel 33.

Figure 7:
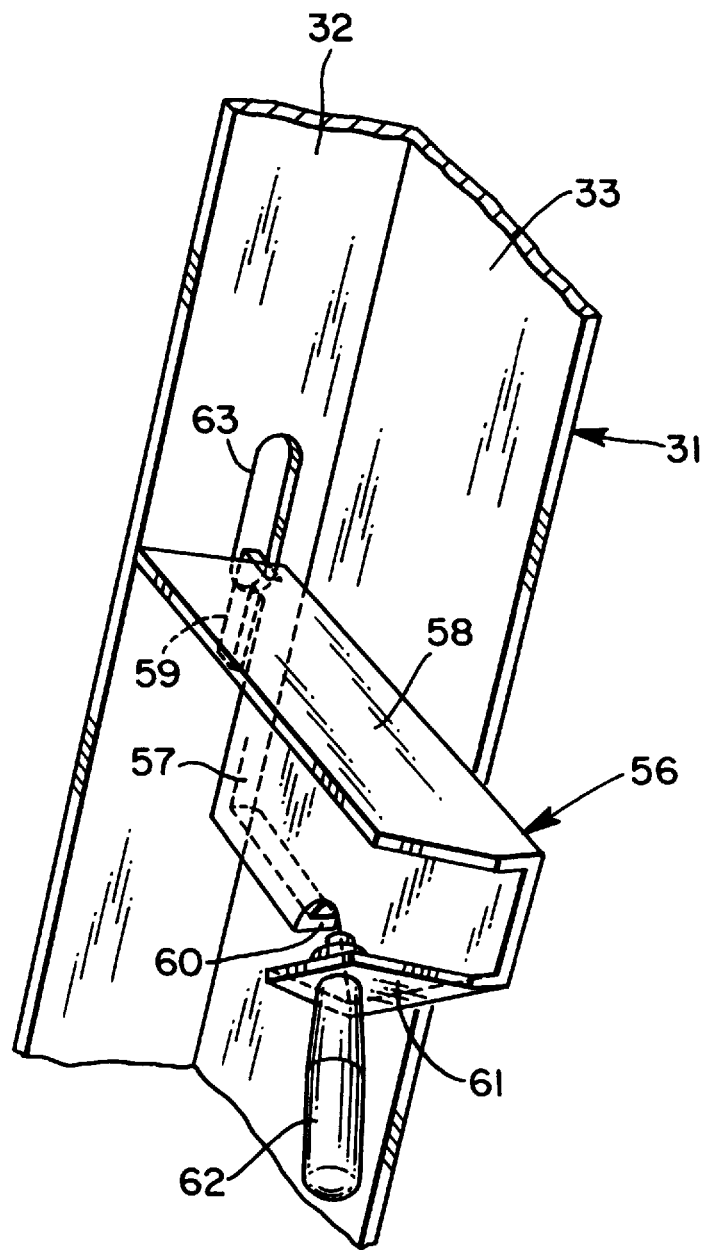
FIG. 7 shows a perspective view of a center portion of the object storage section shown in FIG. 5.

Referring to FIG. 7, a support 56 includes a vertically extending base plate portion 57. When support 56 is mounted on object storage frame 31, a front end of base plate portion 57 contacts front panel 32. Support 56 also includes a horizontally extending support plate portion 58. A front end of support plate portion 58 also contacts front panel 32 when support 56 is mounted on object storage frame 31. An essentially L-shaped hook 59 is formed on an upper front end of base plate portion 57 projecting downward. Support 56 also includes an abutment portion 60 which contacts side panel 33 when support 56 is mounted on object storage frame 31. Abutment portion 60 is formed on a lower end of base plate portion 57. An attachment plate portion 61 is formed on a lower rear end of base plate portion 57. Attachment plate portion 61 holds a handle 62 which is angled downward. Handle 62 facilitates the installation and removal of support 56 by an operator.

Referring also to FIG. 6, each object storage frame 31 includes a plurality of catch holes 63 formed in the middle of front panel 32. Each support 56 is mounted by hooking through one of catch holes 63 with hook 59. Objects A positioned above supports 56 are temporarily supported on support plate portions 58 by supports 56. Therefore, a load of all objects contained in object storage section 13 is divided between the bottom of the stack and support 56. When a number of objects A positioned below support 56 is reduced to a sufficiently small number, support 56 is moved. Objects A which have been temporarily supported on support plate portions 58 are moved to the lower part and stacked on lower positioned objects A. Support 56 reduces the maximum weight that the bottommost object is A is exposed to.

Figure 8:
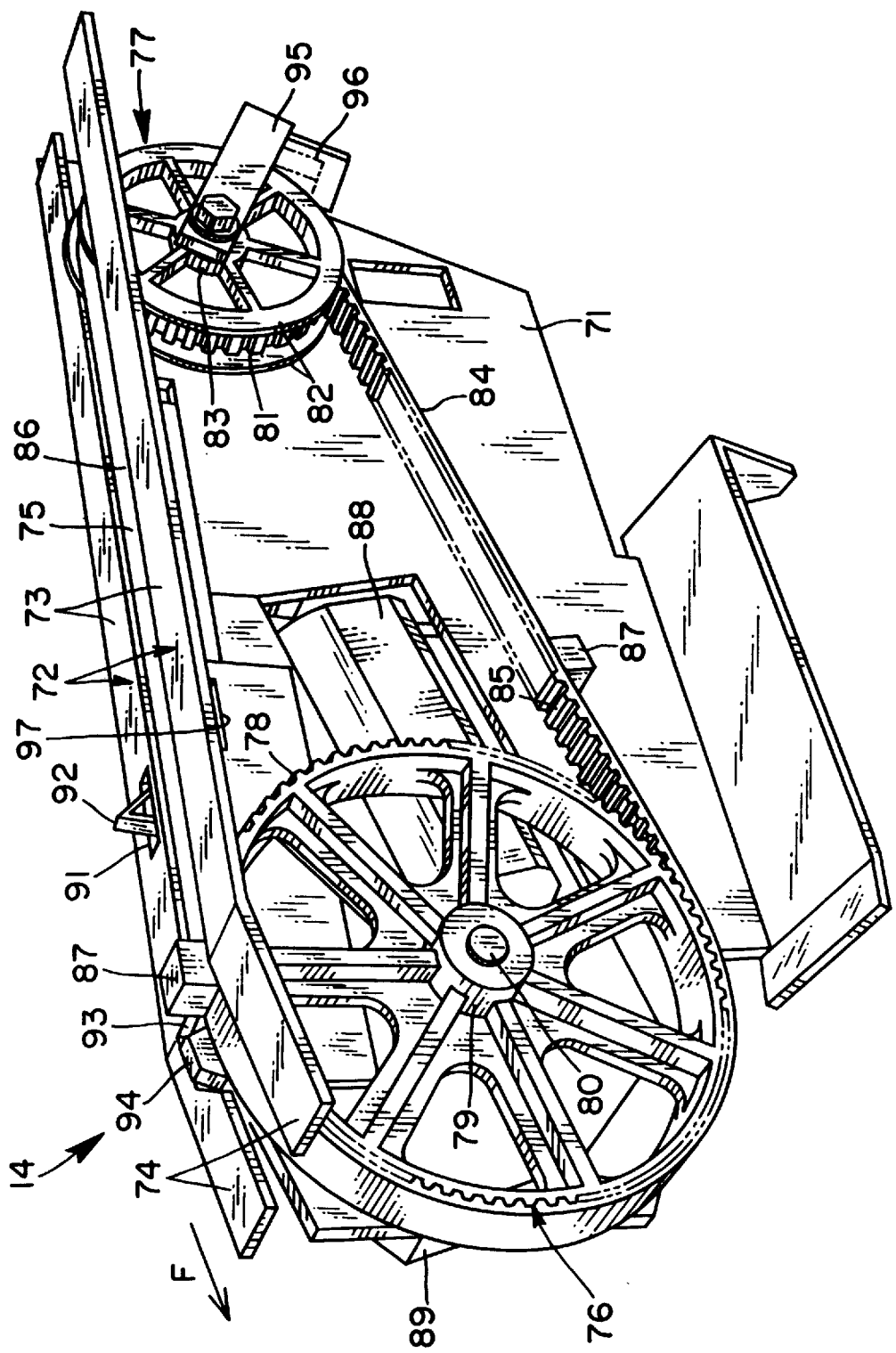
FIG. 8 shows a perspective view of an object discharge unit of the object storage/discharge device of FIG. 1.

Referring to FIG. 8, a slot 75 extends in discharge direction F between load receiving platforms 72. Large timing pulley 76 has a toothed gear portion 78 formed along an outermost circumferential surface thereof. A hub 79 at a center of timing pulley 76 is connected to a driving shaft 80 that extends into frame board 71. A rotating axis of driving shaft 80 is substantially horizontal. The upper part of large timing pulley 76 faces an underside of slot 75 (a plane extended from the underside of the load receiving platforms 72) in close vicinity thereto.

Small timing pulley 77 includes a toothed gear portion 81 along an outermost circumferential surface thereof. Small timing pulley 77 further includes first and second collar portions 82 forming opposed side walls of toothed gear portion 81. Small timing pulley 77 includes a hub 83 at a center thereof. Hub 83 rotatably supports small pulley 77 via a horizontal supporting shaft that is supported by frame board 71. An upper end of collar portions 82 of small pulley 77 may project through slot 75.

A gear portion 85, on an inner surface of timing belt 84, engages toothed gear portions 78 and 81 of large and small timing pulleys 76 and 77, respectively. A top run 86 of timing belt 84 stretches between the upper parts of large and small timing pulleys 76 and 77. Top run 86 fits in slot 75 to travel parallel to supporting surface 73.

Motor 88 and a gear mechanism 89 are mounted on the side of frame board 71 opposite large timing pulley 76. Gear mechanism 89 transmits the rotational driving force of motor 88 to driving shaft 80.

Supporting surface 73 includes a hole 91 cut out of one of the load receiving platforms 72. A detection piece 92 is movably mounted in hole 91 such that it projects above and retracts into cutout hole 91. Detection piece 92 retracts into hole 91 when pushed down by object A on supporting surface 73 to actuate an object detection switch. Detection piece 91 projects above supporting surface 73 in the absence of object A on supporting surface 73.

A discharge projection sensor 96, mounted on a bracket 95 which is attached to the supporting shaft of timing pulley 77, optically detects the passing of one of discharge projections 87 of timing belt 84.

Figure 9A:
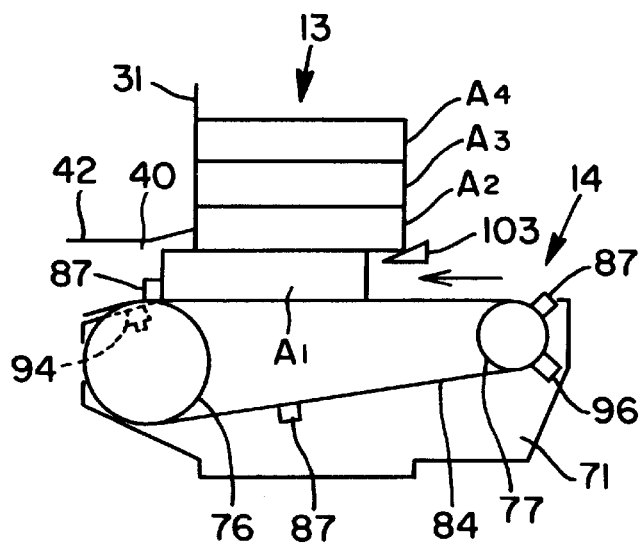
FIG. 9*a* shows the object discharge device of FIG. 8 at the beginning of a discharge cycle.

Referring to FIG. 9a, in the stand-by state ready to discharge, lifting member 103 is at its initial rearward retracted position. In this state, the bottommost object $A_1$ from among a stack of a plurality of objects A contained in each object storage section 13 contacts load receiving platforms 72. Object $A_1$ bears the weight of all other objects A stacked thereon. One of discharge projections 87 of timing belt 84 is at its standard position in the discharge port 40 on the downstream side of object $A_1$, thereby preventing bottommost object $A_1$ from slipping forward out of discharge port 40.

To discharge a bottommost object $A_1$ from object storage/discharge unit 10, air cylinder 102 is actuated to advance lifting member 103 into object storage section 13. Lifting member 103 urges the rear end of next bottommost object $A_2$ forward and upward. Bottommost object $A_1$ is thus relieved of most of the weight of the remainder of objects A. The forward urging tends to wedge the forward end of object $A_2$ against storage frame 31, thereby preventing it from moving downward during subsequent operations.

Figure 9B:
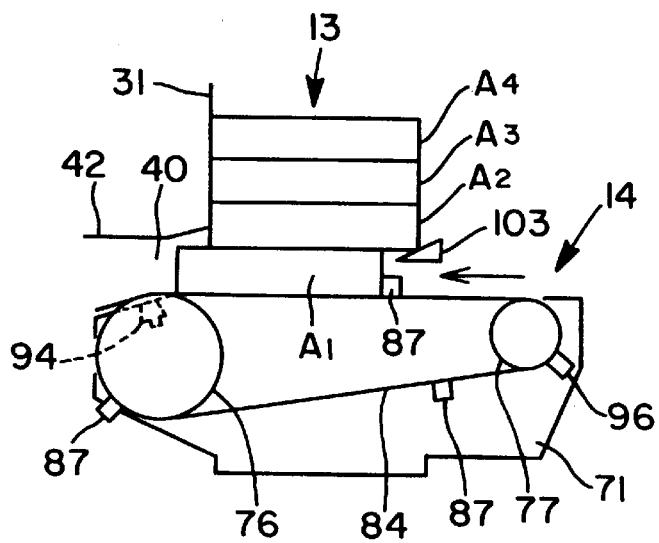
FIG. 9*b* shows the object discharge device of FIG. 9*a* beginning to move the bottommost object out of the object storage device.

Referring to FIG. 9b, motor 88 actuates to rotate timing belt 84. Discharge projection 87 located upstream from bottommost object $A_1$ with respect to discharge direction F contacts the rear of bottommost object $A_1$.

Figure 9C:
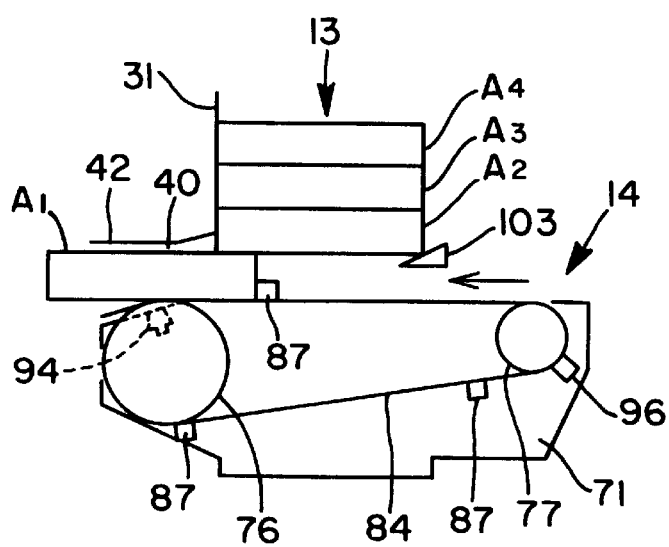
FIG. 9*c* shows the object discharge device of FIG. 9*a* when a discharge detection sensor detects the presence of the bottommost object.

Referring to FIG. 9c, discharge projection 87 pushes bottommost object A1 toward discharge port 40. Discharge detection sensor 94 detects bottommost object $A_1$ being pushed towards discharge port 40.

Figure 9D:
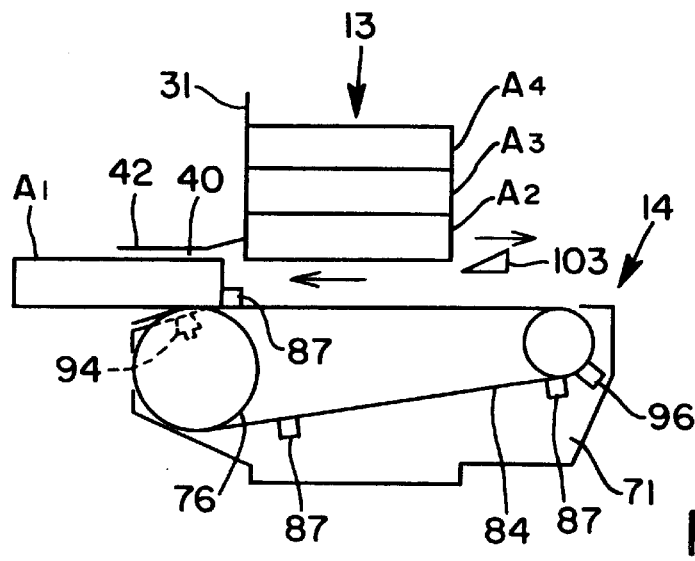
FIG. 9*d* shows the object discharge device of FIG. 9*a* with the bottommost object completely discharged and lifting member retracted.

Referring to FIG. 9d, when bottommost object $A_1$ is pushed out of the bottom of object storage section 13 with the next discharge projection 47 not yet reaching its standard position inside discharge port 40, air cylinder 102 actuates to retract lifting member 103. With the forward wedging of lifting member 103 removed, next bottommost object $A_2$ drops into the position of bottommost object $A_1$.

Figure 9E:
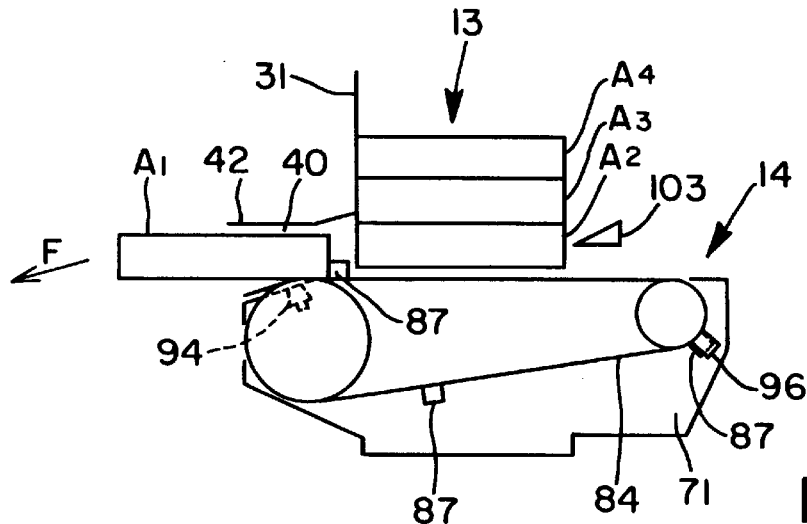
FIG. 9*e* shows the object discharge device of FIG. 9*a* when the objects remaining in the stack are lowered after discharge of the bottommost object.

Referring to FIG. 9e, when original bottommost object $A_1$ is pushed out of the bottom of object storage section 13, discharge projection 87 has almost reached the standard position. Discharge projection detection sensor 96 detects the passing of discharge projection 87 thereby enabling the next discharge action.

When only a single one of objects A is to be discharged, or when the last of a series of objects A is discharged, motor 88 halts with discharge projection 87 stopped at its standard position. This returns the system to its stand-by state waiting for the next cycle of object discharge.

Figure 9F:
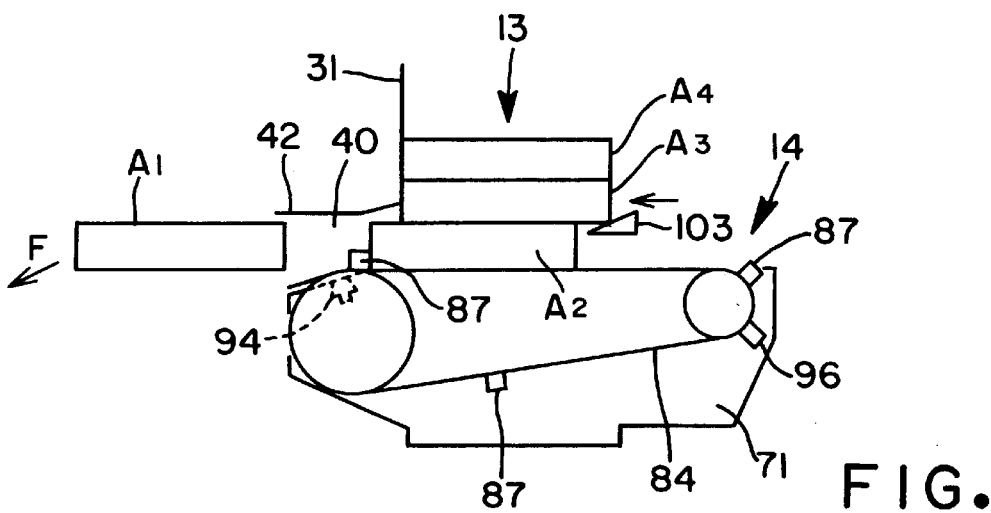
FIG. 9*f* shows the object discharge device of FIG. 9*a* at the beginning of a new discharge cycle with a new bottommost object.

Referring to FIG. 9f, when a plurality of objects A are successively discharged, air cylinder 102 is cyclically actuated to advance and retract lifting member 103, thereby raising objects A positioned above bottommost object $A_1$ and dropping the next of objects A onto the position from which it is discharged. Bottommost object $A_1$, $A_2$, . . . are successively discharged following the same procedure described above, with motor 88 continuously running. After a desired number of objects A are discharged, motor 88 halts with discharge projection 87, which has finished the discharging action, at its standard position inside discharge port 40. This returns the system to its stand-by state waiting for the next cycle of object discharging.

By continuously turning timing belt 84 as described above, objects A are successively discharged at a high speed. Furthermore, stopping discharge projection 87 at its standard position inside discharge port 40 prevents objects A from spilling out of discharge port 40 even though load receiving platforms 72 are inclined toward belt conveyor 11. Thus, erroneous retrieval of objects A is prevented.

When discharging an object, as lifting member 103 lifts next bottommost object $A_2$, bottommost object $A_1$ is relieved of the weight of the other objects A stacked thereon. Therefore, not only is bottommost object $A_1$ consistently discharged with a minimal ejection force, but also is protected from damage such as scrapes on the surface, peeling off of printing on the surface, and tearing of its wrapping.

When discharge projection detection sensor 96 fails to detect the passing of discharge projection 87 at the proper time, controller 98 (shown in FIG. 1) detects this as an abnormal condition and alerts the operator. Furthermore, where discharging detection sensor 94 fails to detect object A or where the presence of object A continues to be detected, controller 98 determines that object A is stuck along the discharge route and alerts the operator.

As each object storage frame 31 is diagonally attached to frame 12 in such a way that its front panel 32 is inclined in discharge direction F and that side panel 33 is inclined in the direction of the side of the object storage frame 31 at which side panel 33 is provided, objects A stacked and contained in object storage section 13 lean against front panel 32 and side panel 33. The moment of the load of objects A which works in a direction perpendicular to supporting plates 72, in other words the direction in which the objects are stacked, is reduced. As the load of upper positioned objects A on lower objects A in each object storage section 13 is thus reduced, objects A are protected from damage which otherwise may be inflicted during their storage or when they are discharged.

When housing narrow objects A, by attaching auxiliary frames 51 to main frame 12 in such a manner that each auxiliary frame 51 faces and extends parallel to the inner surface, against which objects A are supported, of side panel 33 of object storage frame 31, the width of object storage section 13 can be adjusted according to the width of the narrow objects. Thus, a system according to the invention is easy to contain objects A having different widths.

Figure 10:
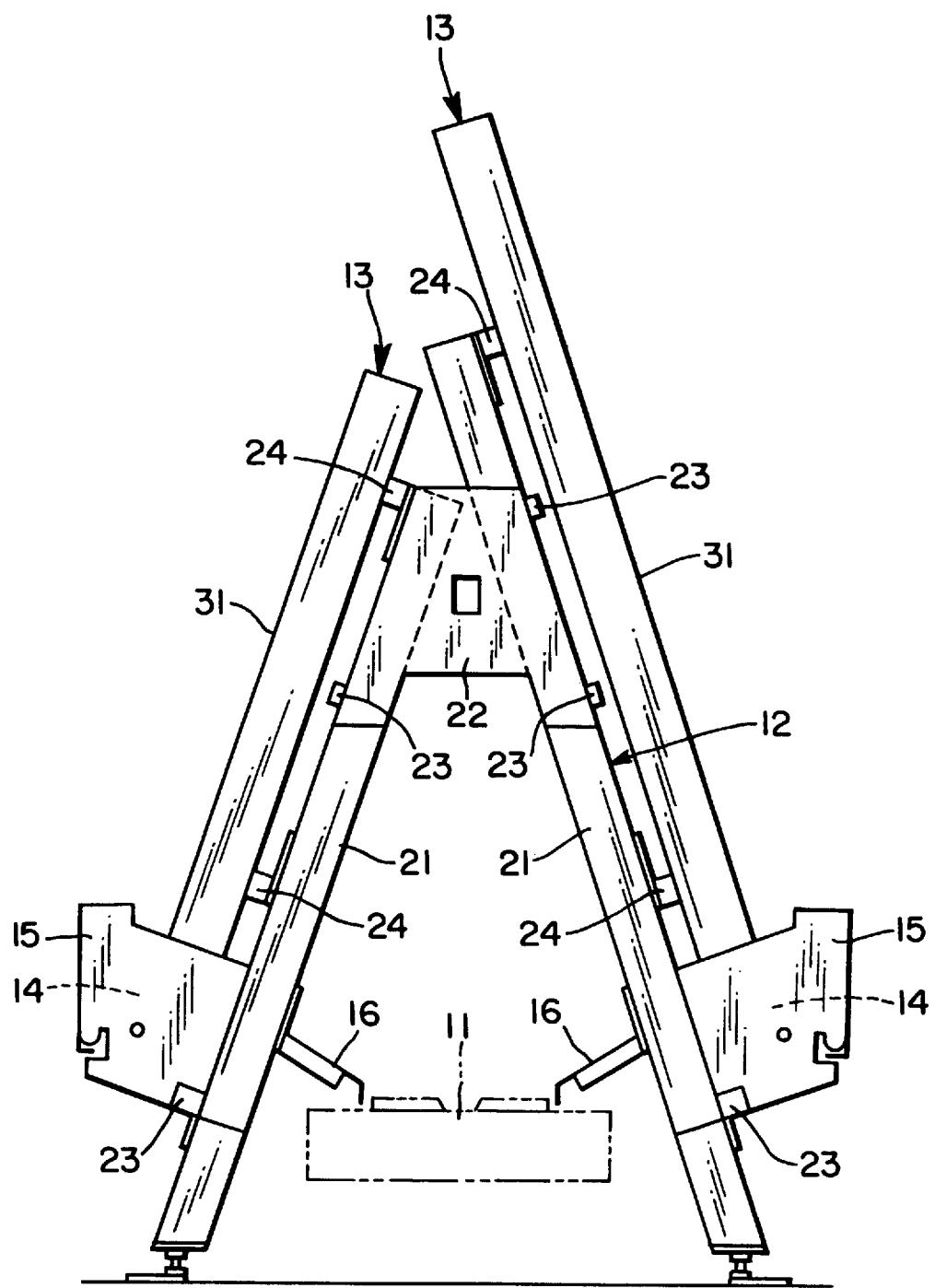
FIG. 10 shows a front view of an object picking system according to another embodiment of the invention.

Referring to FIG. 10, another embodiment of the invention includes leg members 21 and object storage frames 31 on one side of main frame 12 extended further upward so that a capacity of the elongated object storage frames 31 increases.

Figure 11:
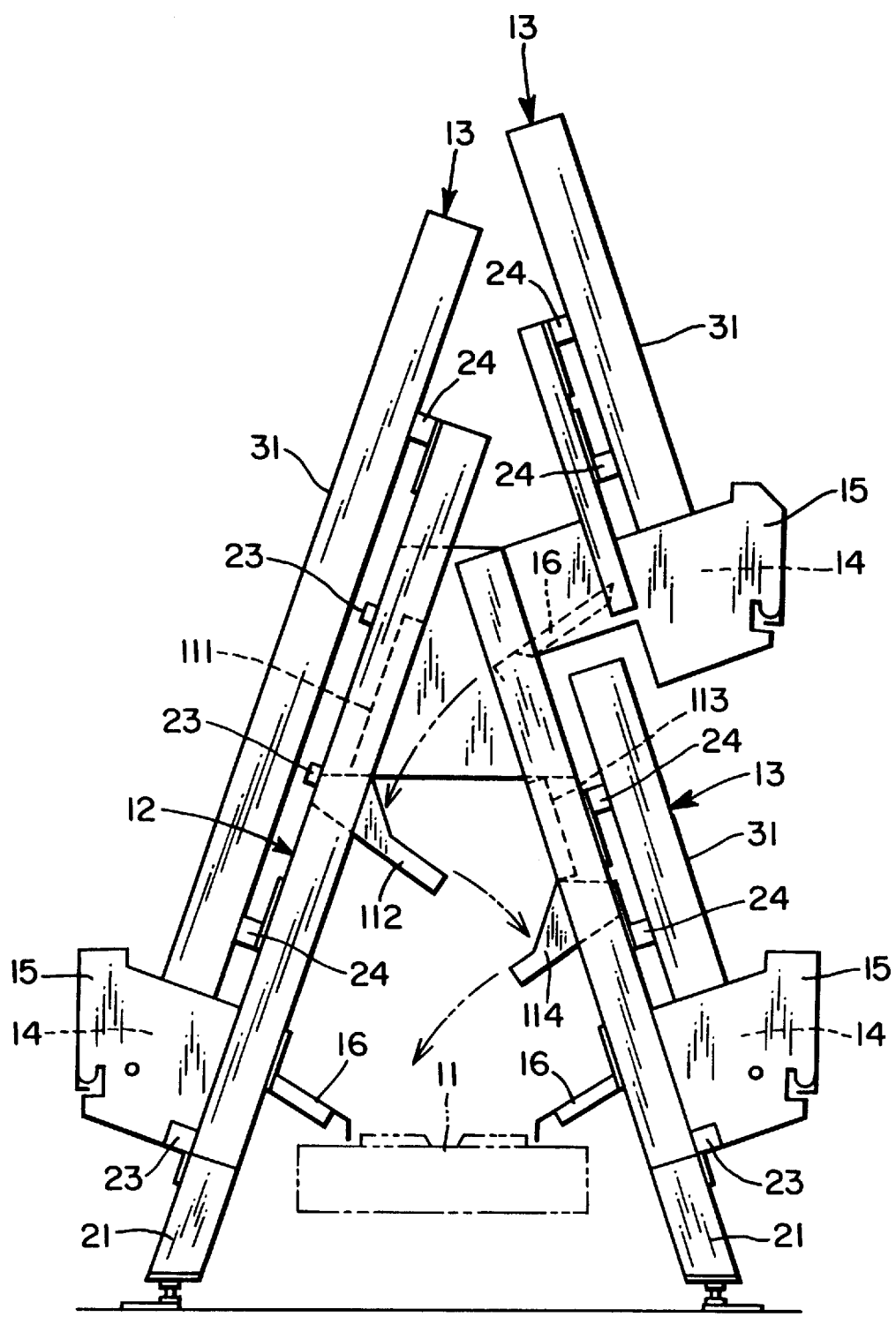
FIG. 11 shows a front view of an object picking system according to yet another embodiment of the invention.

Referring to FIG. 11, in yet another embodiment of the invention, leg members 21 at one side of main frame 12 (hereinafter called the former side) are shortened, and shorter object storage frames 31 are mounted thereon so that another tier of object storage frames 31 and discharge units can be attached to the upper end of main frame 12. The length of leg members 21 at the other side of the main frame is increased to permit longer object storage frames 31 to be attached. A shield 111 and a chute 112 are attached to leg members 21 at the latter side of the main frame, i.e. the side where the longer object storage frames are located. Shield 111 and chute 112 are positioned to face a front end of chute 16 of the upper discharge unit 14 at the former side of main frame 12. A shield 113 and a chute 114 are attached to leg members 21 at the former side of the main frame. Shield 113 and chute 114 are positioned to face the front end of chute 112. Objects A discharged by upper discharge unit 14 fall from chute 16 into chute 112. From chute 112 objects A fall into chute 114. From chute 114 objects A finally fall onto object conveyor 11.

Since one side of main frame 12 is divided into upper and lower tiers, the number of classes of objects to be handled is also increased. Therefore, this embodiment handles a larger variety of objects than the other embodiments. Furthermore, because objects A discharged by upper discharge unit 14 on the side of the main frame are cushioned step by step by a plurality of chutes 16, 112 and 114 before finally falling onto object conveyor 11. By breaking up the descent of objects A from chute 16 to object conveyor 11 into three portions, the maximum falling speed of objects A is reduced and possible damage is correspondingly reduced. Objects A are protected from damage in spite of being discharged from a higher position.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An object picking device for storing at least one stack of a first object and at least a second object and discharging said first object of said at least one stack onto an object conveyor, comprising:

said first object being a lowest object in said stack;
said at least a second object being supported on said first object;
at least a first object storage/discharge device;
said at least first object storage/discharge device having an object storage section;
said object storage section having a front panel and a side panel at an angle to each other;
first means for supporting said object storage section inclined toward said front panel, whereby said objects are gravity urged toward said front panel;
second means for supporting said object storage section inclined toward said side panel, whereby said objects are gravity urged toward said side panel;
each of said at least first object storage/discharge devices each including a bottom platform on which said first object is supported;
said bottom platform having a longitudinal slot;
a discharge port at an end of said bottom platform;
an object lifter movably mounted on each of said plurality of object discharge devices;
said object lifter movable between a retracted position, whereat said object lifter does not raise any of said objects, and an advanced position whereat said object lifter raises said at least a second object; and
means for pushing said first object along said bottom platform through said discharge port when said object lifter raises said at least a second object to reduce the friction on said first object and thereby enabling discharge of said first object while retaining said at least a second object against discharge.

2. The object picking device of claim 1, wherein said object lifter is movably mounted at a lower rear portion of said each one of said at least a first object storage/discharge devices on an opposite end of said bottom platform from said discharge port.

3. The object picking device of claim 2, wherein said means for pushing includes:

first and second pulleys;
a belt reeved about said first and second pulleys;
said pulleys being mounted in said each one of said plurality of object discharge devices such that an upper free-spanning portion of said belt is positioned in a longitudinal slot in said bottom platform;
said belt having a plurality of periodically positioned projections attached to an outer surface thereof;
said plurality of projections projecting above said bottom platform through said longitudinal slot when said plurality of projections are on said upper free-spanning portion of said belt; and
means for driving one of said first and second pulleys.

4. The object picking device of claim 3, wherein a second side panel of a second object storage/discharge device bounds a side of said object storage section of said at least first object storage/discharge device, opposite said side panel of said at least first object storage/discharge device.

5. The object picking device of claim 4, wherein said second object storage/discharge device, having no adjacent object storage/discharge device opposite said side wall, further includes an auxiliary panel connected to a side of said object storage section opposite said second side panel; and means for adjusting a distance between said auxiliary panel and said second side panel.

6. The object picking device of claim 3, further including at least first and second object storage/discharge devices; and said at least first and second object storage/discharge devices aligned in at least upper and lower levels along a first side of said object conveyor.

7. The object picking device of claim 6, further including means for directing said objects from said upper level toward said object conveyor, said means for directing including a plurality of chutes.

8. The object picking device of claim 3, wherein said object storage section includes a mounting hole capable of receiving a support between a top and a bottom of said object storage section, said support including means for supporting an upper stack of objects in said object storage section.

9. The object loading device of claim 3, further including;

an auxiliary panel connected to a side of each of said object storage sections opposite said side panel; and
said auxiliary panel including means for adjusting a distance between said auxiliary panel and said side panel.

10. The object picking device of claim 3, further including:

at least first and second object storage/discharge devices aligned on first and second sides of said object conveyor; and
said object storage/discharge devices on a first side are taller than said object storage/discharge devices on a second side of said object conveyor.

11. The object picking device of claim 2, wherein an upper portion of said discharge port is bounded by a plate; and said at least first object storage/discharge device further includes means for adjusting a vertical position of said plate, whereby a height of said discharge port is adjustable.

12. The object picking device of claim 1, wherein a second side panel of a second object storage/discharge device bounds a side of said object storage section of said at least first object storage/discharge device, opposite said side wall of said at least first object storage/discharge device.

13. The object picking device of claim 2, wherein said second object storage/discharge device, having no adjacent object storage/discharge device opposite said second side panel, further includes an auxiliary panel connected to a side of said object storage section opposite said second side panel; and means for adjusting a distance between said auxiliary panel and said second side panel.

14. The object picking device of claim 1, further including:

at least first and second object storage/discharge devices aligned on first and second sides of said object conveyor; and
said at least first and second object storage/discharge devices are aligned in at least upper and lower levels along a first side of said object conveyor.

15. The object picking device of claim 14, further including means for directing said objects from said upper level toward said object conveyor, said means for directing including a plurality of chutes.

16. The object picking device of claim 1 wherein said object storage section includes a mounting hole capable of receiving a support between a top and a bottom of said object storage section, said support including means for supporting an upper stack of objects in said object storage section.

17. The object picking device of claim 1, further including;

an auxiliary panel connected to a side of said object storage section opposite said side panel; and means for adjusting a distance between said auxiliary panel and said side panel.

18. The object picking device of claim 1, further including:

at least first and second object storage/discharge devices aligned on first and second sides of said object conveyor; and said object storage/discharge devices on a first side are taller than said object storage/discharge devices on a second side of said object conveyor.

19. The object picking device as claimed in claim 1 where said at least a first object storage/discharge device is disposed on a first side of said object conveyer;

said first object storage/discharge device includes at least a first object storage section;

a second object storage/discharge device is disposed on a second side of said object conveyer; and said at least first object storage/discharge device on said first side of said object conveyer is taller than said second object storage/device on said second side.

20. An object picking device for storing at least one stack of at least first and second objects and discharging a first object of said at least one stack onto an object conveyor, comprising:

at least a first object storage/discharge device;

said at least first object storage/discharge device having an object storage section;

said object storage section having a front panel and a side panel at an angle to each other;

means for supporting said at least first object storage/discharge device;

first means for supporting said object storage section inclined toward said front panel, whereby said objects are gravity urged to said front panel;

second means for supporting said object storage section inclined toward said side panel, whereby said objects are gravity urged to said side panel;

a plurality of chutes;

said objects fall a distance from object storage/discharge device onto a first of said plurality of chutes;

said objects fall a second distance from said first of said plurality of chutes onto a next chute;

said objects fall repeatedly onto a next one of said plurality of chutes until said objects fall onto said object conveyor.

21. An object picking device for storing at least one stack of a first object and at least a second object and discharging said first object of said at least one stack onto an object conveyor, comprising:

said first object being a lowest object in said stack;

said at least a second object being supported on said first object;

at least first and second object storage/discharge devices mounted adjacent to each other on at least one side of said object conveyor;

each of said at least first and second object storage/discharge devices includes an object storage section and a mechanism including a bottom platform on which said first object is supported;

said object storage section having a front panel and a side panel at an angle to each other;

said front panel facing said object conveyor;

first means for supporting said object storage section inclined toward said front panel, whereby said objects are gravity urged toward said front panel;

second means for supporting said object storage section inclined toward said side panel, whereby said objects are gravity urged toward said side panel;

a plate connected to a bottom of said front panel;

said plate being positioned at a predetermined height from a bottom surface of said object storage section to form a discharge port;

means for adjusting said predetermined height of said plate thereby adjusting a height of said discharge port;

an auxiliary panel connected to a side of each of said object storage sections opposite said side panel;

means for adjusting a distance between said auxiliary panel and said side panel;

an object lifter movably mounted on each of said plurality of object discharge devices;

said object lifter movable between a retracted position, whereat said object lifter does not raise any of said objects, and an advanced position whereat said object lifter raises said at least a second object;

means for pushing said first object along said bottom platform through said discharge port when said object lifter raises said at least a second object to reduce the friction on said first object and thereby enabling discharge of said first object while retaining said at least a second object against discharge.

* * * * *